United States Patent
Kawakusu

(10) Patent No.: US 10,494,542 B2
(45) Date of Patent: Dec. 3, 2019

(54) POLYESTER RESIN, RESIN COMPOSITION FOR CAN PAINT, PAINTED METAL PLATE FOR CAN, AND CAN

(71) Applicant: TOYOBO CO., LTD., Osaka (JP)

(72) Inventor: Tetsuo Kawakusu, Shiga (JP)

(73) Assignee: TOYOBO CO., LTD., Osaka (JP)

( * ) Notice: Subject to any disclaimer, the term of this patent is extended or adjusted under 35 U.S.C. 154(b) by 649 days.

(21) Appl. No.: 14/384,228

(22) PCT Filed: Feb. 25, 2013

(86) PCT No.: PCT/JP2013/054685
§ 371 (c)(1),
(2) Date: Sep. 10, 2014

(87) PCT Pub. No.: WO2013/145992
PCT Pub. Date: Oct. 3, 2013

(65) Prior Publication Data
US 2015/0064378 A1    Mar. 5, 2015

(30) Foreign Application Priority Data

Mar. 28, 2012 (JP) .................... 2012-073858

(51) Int. Cl.
| | | |
|---|---|---|
| B65D 25/14 | (2006.01) | |
| B65D 25/34 | (2006.01) | |
| C08G 63/183 | (2006.01) | |
| C09D 167/00 | (2006.01) | |
| C09D 167/02 | (2006.01) | |
| C08G 63/00 | (2006.01) | |

(52) U.S. Cl.
CPC ........... *C09D 167/02* (2013.01); *B65D 25/14* (2013.01); *B65D 25/34* (2013.01); *C08G 63/00* (2013.01); *C08G 63/183* (2013.01); *C09D 167/00* (2013.01); *Y10T 428/1355* (2015.01); *Y10T 428/31681* (2015.04)

(58) Field of Classification Search
CPC .... C08G 63/181; C08G 63/183; C08G 63/02; C08G 63/12; C08G 63/127; C08G 63/1316; C08G 63/189; C08G 2150/90; C08G 2390/40; B65D 25/14; B65D 25/24; B65D 25/34; C09D 167/00; C09D 167/02; Y10T 428/1355; Y10T 428/31681; C08J 2367/02; C08J 2367/03
USPC ........ 524/539, 605; 528/298, 371; 428/35.8, 428/458
See application file for complete search history.

(56) References Cited

U.S. PATENT DOCUMENTS

| | | | | |
|---|---|---|---|---|
| 3,686,361 | A * | 8/1972 | De Witt, III ............ | C08L 67/02 524/296 |
| 5,288,559 | A * | 2/1994 | Oka ..................... | C09D 167/00 428/458 |
| 5,563,223 | A * | 10/1996 | Tachika ............... | C08G 63/183 524/601 |
| 6,727,294 | B2 | 4/2004 | Kanayama et al. | |
| 2005/0014012 | A1 | 1/2005 | Stapperfenne et al. | |
| 2010/0015456 | A1 | 1/2010 | Lizotte et al. | |

FOREIGN PATENT DOCUMENTS

| | | |
|---|---|---|
| EP | 0 538 774 | 4/1993 |
| EP | 1 498 461 | 1/2005 |
| JP | 4-036364 | 2/1992 |
| JP | 7-113059 | 5/1995 |
| JP | 11-081154 | 3/1999 |
| JP | 11-302361 | 11/1999 |
| JP | 2001-002905 | 1/2001 |
| JP | 2001-106968 | 4/2001 |
| JP | 2001106968 A * | 4/2001 |
| JP | 2004-217682 | 8/2004 |
| JP | 2004-359759 | 12/2004 |

(Continued)

OTHER PUBLICATIONS

Office Action dated Jul. 14, 2016 in corresponding European patent application No. 13768995.6.

(Continued)

*Primary Examiner* — Lee E Sanderson
(74) *Attorney, Agent, or Firm* — Wenderoth, Lind & Ponack, L.L.P.

(57) ABSTRACT

This invention provides a polyester resin that is capable of forming a coating film having extremely excellent curability, processability, retort resistance, content resistance, and dent resistance, and also provides a resin composition for a coating composition containing the polyester resin. The polyester resin obtained from a polycarboxylic acid component and a polyol component, wherein the polyester resin meets the conditions (i) to iii) described below:
  (i) among the polycarboxylic acid components constituting the polyester resin, the total copolymerization ratio of terephthalic acid component and 2,6-naphthalenedicarboxylic acid component is 80 mol % or more;
  (ii) among the polycarboxylic acid components constituting the polyester resin, the copolymerization ratio of 2,6-naphthalenedicarboxylic acid component is 2 to 80 mol %; and
  (iii) among the polyol components constituting the polyester resin, the total copolymerization ratio of ethylene glycol component and 1,2-propylene-glycol component is 50 mol % or more, wherein the copolymerization ratio of 1,2-propylene-glycol component is excessive relative to the copolymerization ratio of the ethylene glycol component.

6 Claims, No Drawings

(56) References Cited

FOREIGN PATENT DOCUMENTS

| JP | 2005-042110 | 2/2005 |
| JP | 2008-081617 | 4/2008 |
| JP | 2012-001688 | 1/2012 |

OTHER PUBLICATIONS

Extended European Search Report dated Sep. 2, 2015 in corresponding European patent application No. 13 76 8995.
International Search Report dated Mar. 19, 2013 in International (PCT) Application No. PCT/JP2013/054685.

* cited by examiner

POLYESTER RESIN, RESIN COMPOSITION FOR CAN PAINT, PAINTED METAL PLATE FOR CAN, AND CAN

TECHNICAL FIELD

The present invention relates to a polyester resin that is capable of forming a coating film having excellent processability, curability, retort resistance, content resistance, and dent resistance when the resin is used as a base resin to be added to a coating composition (paint) that is to be applied to foods and beverages cans. The invention, in particular, relates to a polyester resin that is suitably usable as a base resin for the inner surface can coating composition. Furthermore, the present invention relates to a resin composition for can coating (paint), a coated (painted) metal plate for can, and to cans.

BACKGROUND ART

Generally, coating is applied to the inner surfaces of food and beverage cans in order to prevent the corrosion of the can material due to the wide variety of contents therein. The coating composition applied to the inner surfaces of food and beverage cans is required to have the following properties. First, the coating composition should be free from toxicity, and have sufficient curability (curability); second, the coating composition is required to have excellent processability during molding (processability), tolerance during heat sterilization (retort resistance), no blister or blushing when contents containing salt or that exhibit acidity are subjected to heat sterilization (content resistance), impact resistance after heat sterilization (dent resistance), and the like. In recent years, the use of bisphenol-type epoxy resins and the like has been avoided since there is a concern that such resins function as extrinsic factor endocrine disrupters (hereinafter, these may be referred to as environmental hormones).

Currently, polyvinyl chloride-based resins and epoxy-phenol-based resins are often used as a base resin for coating compositions for the inner surfaces of cans. However, because these resins have the serious problems indicated below, there is a demand for the development of a coating agent for inner surfaces that will replace the above-mentioned resins.

Although polyvinyl chloride-based resins exhibit excellent retort resistance, content resistance, and processability, the vinyl chloride monomer remaining in the resins are indicated to have serious health dangers such as carcinogenicity. Furthermore, when the cans are incinerated, there is a risk that highly toxic and corrosive chlorine gas, hydrogen chloride gas, and extremely toxic dioxin may be generated from the polyvinyl chloride-based resins, which may cause the corrosion of the incinerator and environmental pollution. In addition, polyvinyl chloride-based resins have insufficient adhesion with metals, which are materials for cans; therefore, it is necessary to perform a surface treatment using an epoxy resin before coating, complicating the coating process.

Epoxy-phenol-based resins require a high baking temperature; accordingly, poor appearance, such as foaming, may easily occur during baking. Furthermore, as described above, bisphenol A contained in epoxy resins may function as an environmental hormone.

In addition to the above-described processability and retort resistance that are required for coating compositions for inner can surfaces, coating compositions for the external can surfaces are also required to have countermeasures against environmental hormones.

In order to solve the above problems, the application of a polyester-based resin to a coating composition for the inner surfaces of cans has been attempted, therein the polyester-based resin does not generate a toxic gas and/or corrosive gas during incineration, and does not contain an environmental hormone, such as bisphenol A, in the coating film. However, a coating composition resin and a coating composition resin composition that simultaneously exhibit satisfactory processability, curability, retort resistance, content resistance, and dent resistance that are suitable for use in cans have not been obtained.

Patent Literature 1 discloses a polyester resin that has excellent flavor preservability, that is environmentally friendly and highly safe from a health standpoint, wherein the polyester resin is used for a coating composition for a metal package. The polyester resin is obtainable by copolymerizing a dicarboxylic acid component composed of 80 to 100 mol % of terephthalic acid and 0 to 20 mol % of isophthalic acid with a glycol component composed of 60 to 90 mol % of propylene glycol, and 10 to 30 mol % of ethylene glycol or 1,3-butylene glycol. However, such a technique has drawbacks in regards to achieving sufficient processability and/or curability.

Patent Literature 2 discloses a polyester resin for use in a can coating composition, the polyester resin being obtainable by reacting an acid component composed of 80 to 100 mol % aromatic dicarboxylic acid containing 70 to 95 mol % terephthalic acid and 0 to 20 mol % polybasic acid other than aromatic dicarboxylic acid with a glycol component comprising 2-methyl-1,3 propanediol and 1,4-cyclohexane dimethanol as essential components, wherein among the glycol components constituting the polyester resin, the content of 2-methyl-1,3 propanediol is 25 to 50 mol % relative to the total glycol components, and wherein the total weight of terephthalic acid and 1,4-cyclohexane dimethanol falls within the range of 45 to 65 wt % relative to the polyester resin. Patent Literature 2 also discloses that the resulting polyester resin is excellent in processability and stain resistance. However, the above technique has drawbacks in regards to obtaining satisfactory processability and/or curability.

Patent Literature 3 discloses a coating composition comprising hydroxy-containing polyester resin and phenol-formaldehyde resin as essential components, and further comprising benzoguanamine-formaldehyde resin and/or blocked polyisocyanate, etc. Patent Literature 3 also discloses that the resulting coating composition is excellent in processability, curability, and retort resistance. However, the above technique has drawbacks in regards to obtaining satisfactory processability and/or curability.

CITATION LIST

Patent Literature

PTL 1: JP2004-359759A
PTL 2: JP2008-81617A
PTL 3: JP2005-42110A

SUMMARY OF INVENTION

Technical Problem

The present invention was made in consideration of the drawbacks of the prior art techniques. Specifically, an object of the present invention is to provide a polyester resin that is capable of forming a coating film having extremely high curability, as well as excellent processability, retort resistance, content resistance, and dent resistance.

Solution to Problem

The present inventors conducted research in order to achieve the above object, and thus accomplished the present invention. The present invention has the following features (1) to (7).

(1) A polyester resin obtained from a polycarboxylic acid component and a polyol component, wherein the polyester resin insets the conditions (i) to (iii) described below.

(i) among the polycarboxylic acid components constituting the polyester resin, the total copolymerization ratio of terephthalic acid component and 2,6-naphthalenedicarboxylic acid component is 80 mol % or more;

(ii) among the polycarboxylic acid components constituting the polyester resin, the copolymerization ratio of 2,6-naphthalenedicarboxylic acid component is 2 to 80 mol %; and (iii) among the polyol components constituting the polyester resin, the total copolymerization ratio of ethylene glycol component and 1,2-propylene-glycol component is 50 mol % or more, wherein the copolymerization ratio of 1,2-propylene-glycol component is excessive relative to the copolymerization ratio of the ethylene glycol component.

(2) The polyester resin of (1), which has a reduced viscosity of 0.3 to 0.7 dl/g, a glass transition temperature of 70° C. or more, a specific gravity (30° C.) of 1.245 or more, and an acid value of 200 eq/t or less.

(3) A resin composition for can coating comprising the polyester resin of (1) or (2) and a curing agent, which contains the polyester resin and the curing agent in a weight ratio of polyester resin/curing agent=98/2 to 50/50 (parts by weight).

(4) The resin composition for can coating of (3), wherein the curing agent is a blocked isocyanate compound.

(5) A method for producing a coated metal plate for can, comprising a step of applying the resin composition for can coating of (3) or (4) to a metal plate, and curing the resin composition.

(6) A coated metal plate for can on which a layer comprising a reactant of the polyester resin of (1) or (2) and a curing agent is placed on the surface of the metal plate.

(7) A can comprising the coated metal plate for can of (6) as a constituting material.

Advantageous Effects of Invention

The resin composition used for the coating composition of the present invention comprises a polyester resin and a curing agent, has extremely high curability, and allows the resulting coating film to possess excellent processability as well as remarkable retort resistance, content resistance, and dent resistance. Therefore, the resin composition of the present invention is suitable for use as a can coating composition.

DESCRIPTION OF EMBODIMENTS

The polyester resin of the present invention can be obtained by reacting a polycarboxylic acid component with a polyol component, wherein the polyester resin satisfies the following conditions (i) to (iii).

(i) Among the polycarboxylic acid components constituting the polyester resin, the octal copolymerization ratio of terephthalic acid component and 2,6-naphthalenedicarboxylic acid component is 80 mol % or more;

(ii) among the polycarboxylic acid components constituting the polyester resin, the copolymerization ratio of 2,6-naphthalenedicarboxylic acid component is 2 to 80 mol %; and (iii) among the polyol components constituting the polyester resin, the total copolymerization ratio of ethylene glycol component and 1,2-propylene-glycol component is 50 mol % or more, wherein the copolymerization ratio of 1,2-propylene-glycol component is excessive relative to the copolymerization ratio of the ethylene glycol component.

Examples of polycarboxylic acid components constituting the polyester resin of the present invention include aromatic dicarboxylic acids such as terephthalic acid, isophthalic acid, orthophthalic acid, phenylenedicarboxylic acid, and 2,6-naphthalenedicarboxylic acid; aliphatic dicarboxylic acids such as succinic acid, glutaric acid, adipic acid, azelaic acid, sebacic acid, dodecanedioic acid, and dimer acid; alicyclic dicarboxylic acids such as 1,4-cyclohexanedicarboxylic acid, tetrahydrophthalic acid, hexahydroisophthalic acid, and 1,2-cyclohexene dicarboxylic acid; and unsaturated dicarboxylic acids such as fumaric acid, maleic acid, and terpene-maleic acid adduct. One, two, or more of the acids above may be selected for use. Among these, in terms of processability, retort resistance, and content resistance, the use of terephthalic acid and/or 2,6-naphthalenedicarboxylic acid is preferable.

The total copolymerization ratio of terephthalic acid and 2,6-naphthalenedicarboxylic acid constituting the polyester resin of the present invention, relative to the total acid components (total polycarboxylic acid components), is preferably 80 to 100 mol %, more preferably 85 to 100 mol %, even more preferably 90 to 100 mol %, and particularly preferably 95 to 100 mol %. A total copolymerization ratio lower than the above-mentioned ranges may result in unduly low processability and/or dent resistance.

The lower limit of the copolymerization ratio of 2,6-naphthalenedicarboxylic acid constituting the polyester resin of the present invention, relative to the total acid components (total polycarboxylic acid components), is 2 mol %, more preferably 3 mol %, and particularly preferably 4 mol %. A copolymerization ratio of 2,6-naphthalenedicarboxylic acid lower than the aforementioned ranges may result in unduly low solvent solubility and/or coating composition stability, or may undesirably lower the processability, curability, and/or dent resistance. The upper limit of the copolymerization ratio of 2,6-naphthalenedicarboxylic acid, relative to the total acid component, is preferably 80 mol %, more preferably 70 mol %, even more preferably 60 mol %, particularly preferably 50 mol %, and most preferably 40 mol %. A copolymerization ratio of 2,6-naphthalenedicarboxylic acid lower than the aforementioned ranges may result in unduly low solvent solubility and/or coating composition stability, and/or undesirably lower the processability and/or dent resistance.

Examples of the polyol components constituting the polyester resin of the present invention include aliphatic glycols such as ethylene glycol, 1,2-propylene glycol, 1,3-propanediol, 2-methyl-1,3-propanediol, neopentyl glycol, 3-methyl-1,5-pentanediol, 1,2-butanediol, 1,3-butanediol, 1,4-butanediol, 1,4-pentanediol, 1,3-pentanediol, 2,4-diethyl-1,5-pentanediol, 1,6-hexanediol, 1-methyl-1,8-octanediol, 3-methyl-1,6-hexanediol, 4-methyl-1,7-heptanediol, 4-methyl-1,8-octanediol, 4-propyl-1,8-octanediol, and 1,9- nonanediol; polyether glycols such as diethylene glycol, triethylene glycol, polyethylene glycol, polypropylene glycol, and polytetramethylene glycol; and alicyclic polyols such as 1,2-cyclohexane dimethanol, 1,3-cyclohexane dimethanol, 1,4-cyclohexane dimethanol, tricyclodecane glycols, and hydrogenated bisphenols. One, two, or more polyol components may be selected from the above for use. Among these, the use of ethylene glycol and/or 1,2-propylene glycol is preferable in terms of retort resistance and content resistance.

The total copolymerization ratio of ethylene glycol and 1,2-propylene glycol constituting the polyester resin of the present invention, relative to total polyol components, is preferably 50 to 100 mol %, more preferably 60 to 100 mol %, even more preferably 70 to 100 mol %, particularly preferably 80 to 100 mol %, and most preferably 90 to 100 mol %. A total copolymerization ratio lower than the above ranges may unfavorably lower Tg, and may adversely affect the retort resistance and/or content resistance, lowering its dent resistance accordingly.

The lower limitation of the copolymerization ratio of ethylene glycol constituting the polyester resin of the present invention, relative to total polyol components, is preferably 5 mol %, more preferably 10 mol %, even more preferably 13 mol %, and particularly preferably 15 mol %. If the ethylene glycol copolymerization ratio is lower than the aforementioned ranges, the curability may be lowered and Tg may also be lowered, causing unfavorable retort resistance and/or content resistance. The upper limit of the copolymerization ratio of ethylene glycol, relative to total polyol components, is preferably 45 mol %, more preferably 40 mol %, and even more preferably 35 mol %. If the copolymerization ratio exceeds the aforesaid ranges, the crystallinity of polyester resin will become unduly high, and the solvent solubility and/or coating composition stability may be lowered.

The lower limit of the copolymerization ratio of 1,2-propylene glycol constituting the polyester resin of the present invention, relative to the total polyol components, is preferably 45 mol %, more preferably 50 mol %, even more preferably 55 mol %, particularly preferably 60 mol %, and most preferably 65 mol %. When the copolymerization ratio is lower than the aforementioned ranges, the solvent solubility and/or coating composition stability may be lowered. The upper limit of the copolymerization ratio of 1,2-propylene glycol, relative to the total polyol components, is preferably 95 mol %, more preferably 90 mol %, even more preferably 85 mol %, and particularly preferably 80 mol %. When the copolymerization ratio exceeds the aforementioned ranges, the processability and/or curability may be lowered.

In forming the polyester resin of the present invention, it is necessary that the copolymerization ratio of 1,2-propyleneglycol component be excessive relative to the copolymerization ratio of the ethylene glycol component. The lower limit of the value subtracted from the copolymerization ratio (molar ratio) of 1,2-propylene glycol to the copolymerization ratio of ethylene glycol is preferably 10 mol %, more preferably 20 mol %, even more preferably 30 mol %, and particularly preferably 35 mol %. When the value is lower than the aforementioned ranges, the crystallinity of polyester resin becomes unduly high, solvent solubility and/or coating composition stability may be lowered, and processability and/or dent resistance may be lowered.

In forming the polyester resin of the present invention, a polycarboxylic acid component and/or polyol component may be copolymerized with a tri- or higher functional component. Examples of tri- or higher functional polycarboxylic acid components include trimellitic acid, pyromellitic acid, and benzophenone tetracarboxylic acid. Examples of tri- or higher functional polyols include glycerol (glycerin), trimethylolethane, trimethylolpropane, mannitol, sorbitol, pentaerythritol, and α-methyl glucoside. Use of these components increases the crosslinking density when the coating composition is cured, improving the processability.

The copolymerization ratio of a tri- or higher functional acid component (functional polycarboxylic acid component) and a glycol component (polyol component), in acids or in glycol components, is preferably 0 to 5 mol %, more preferably 0 to 4 mol %, even more preferably 0 to 3 mol %, and particularly preferably 0 to 2 mol %. When the copolymerization ratio exceeds the aforementioned ranges, the flexibility of the polyester resin is lost, lowering the processability and/or dent resistance, or causing gelation during polymerization of polyester.

An acid value may be added to the polyester resin of the present invention by any method. Providing an acid value achieves the following effects. That is, improving the curability of the polyester resin with crosslinking agent, and enhancing the adhesion to the metal material for cans or the like. Examples of methods for providing an acid value include a depolymerization method in which polyvalent carboxylic acid anhydride is added in the second half of the polycondensation process, and a method in which a prepolymer (oligomer) is made to have a high acid value, followed by polycondensation to obtain polyester resin having an acid value. The former depolymerization method is more preferable due to its simple operation and ability to obtain a target acid value.

Examples of the polyvalent carboxylic acid anhydrides usable for acid addition in such a depolymerization method include phthalic anhydride, tetrahydrophthalic anhydride, succinic anhydride, trimellitic anhydride, pyromellitic anhydride, and hexahydrophthalic anhydride. Among these, trimellitic anhydride is preferable.

Among the properties of the polyester resin of the present invention, the acid value is preferably 0 to 200 eq/t, more preferably 0 to 180 eq/t, even more preferably 0 to 160 eq/t, and further more preferably 0 to 150 eq/t. If the acid value exceeds the aforesaid ranges, the retort resistance and/or content resistance may become unfavorable.

Among the properties of the polyester resin of the present invention, the lower limit of the reduced viscosity (dl/g) is preferably 0.3. If the reduced viscosity is lower than the aforesaid value, the processability and curability may be undesirably lowered. The upper limit of the reduced viscosity (dl/g) is preferably 0.7. If the reduced viscosity exceeds the aforesaid value, the solvent solubility may be lowered. This may adversely affect the coating composition stability and coating operability. The term "reduced viscosity" in the present invention is defined as the value measured in accordance with the method described in the Examples.

Among the properties of the polyester resin of the present invention, the lower limit of the glass transition temperature (Tg) is preferably 70° C., more preferably 75° C., even more preferably 78° C., and particularly preferably 80° C. If the glass transition temperature (Tg) is lower than the above ranges, the retort resistance and/or content resistance may become undesirably low. The upper limit of the glass transition temperature (Tg) is preferably 120° C., more preferably 100° C., and even more preferably 105° C. Exceeding the above range is undesirable from economical and productivity points of view. Tg in the present invention is almost the same as that of $T_{ig}$ defined by JISK7121-1987;

strictly, however, the value is defined as the value measured by the method described in the Examples.

Among the properties of the polyester resin of the present invention, the lower limit of the specific gravity is preferably 1.245, more preferably 1.248, even more preferably 1.250, particularly preferably 1.255, and most preferably 1.260. If the specific gravity is lower than the aforesaid ranges, the processability and curability may be undesirably lowered. The specific gravity is preferably 1.400. Production of resin having a specific gravity exceeding the aforementioned range is difficult from a technical standpoint. The specific gravity in the present invention is defined as the value measured by the method described in the Examples.

Among the properties of the polyester resin of the present invention, the glass transition temperature (Tg) can be controlled by changing the copolymerization components and the proportions thereof. For example, Tg tends to become higher by increasing, as the polycarboxylic acid component constituting the polyester resin, the copolymerization ratio of aromatic polycarboxylic acid or alicyclic polycarboxylic acid. Tg also tends to become higher by increasing, as the polyol component constituting the polyester resin, the copolymerization ratio of an alicyclic polyol or aliphatic polyol whose principal chain has 3 or fewer carbon atoms. In contrast, Tg tends to be lowered by increasing the copolymerization ratio, as the polycarboxylic acid component constituting the polyester resin, of aliphatic polycarboxylic acid. Tg also tends to be lowered by increasing the copolymerization ratio, as the polyol component constituting the polyester resin, of an aliphatic polyol polyester resin whose principal chain has 4 or more carbon atoms.

Among the properties of the polyester resin of the present invention, the specific gravity can be controlled by changing the copolymerization components and the proportions thereof. For example, the specific gravity tends to become higher by increasing the copolymerization ratio of, as the polyol components constituting the polyester resin, an aliphatic polyol whose principal chain has 3 or less carbon atoms and whose side chain has 2 or less carbon atoms. In contrast, the specific gravity tends to be lowered by increasing the copolymerization ratio of, as the polycarboxylic acid components constituting the polyester resin, an aliphatic polycarboxylic acid whose principal chain has 4 or more carbon atoms with or without a side chain. The specific gravity also tends to be lowered by increasing the copolymerization ratio of, as the polyol components constituting the polyester resin, an aliphatic polyol whose principal chain has 4 or more carbon atoms with or without a side chain, or by increasing the copolymerization ratio of an aliphatic polyol whose principal chain has 3 or more carbon atoms and whose side chain has 3 or more carbon atoms.

The polyester resin of the present invention can be produced by a known polycondensation method of polyesters. For example, a direct polymerization method, wherein a polycarboxylic acid component and a polyol component are esterified to obtain an oligomer, can be used. The oligomer thus obtained is further subjected to melt-polycondensation under a reduced pressure and high temperature. Another example is a transesterification method in which $C_{1-2}$ lower alkyl ester obtained from polycarboxylic acid is subjected to transesterification with a polyol component to obtain an oligomer, and the resulting oligomer is further subjected to melt-polycondensation under a reduced pressure and high temperature. The polyester resin of the present invention may be produced by either method, since there is no observable difference between the properties thereof and the properties of the resulting resin composition for can coating.

In terms of the solvent solubility and coating composition stability, the properties of the polyester resin of the present invention are preferably such that no clear peaks of melting point (Tm) measured by differential scanning calorimetry (DSC) are observed. When the polyester resin indicates a melting point and has crystallinity, the solvent solubility and/or coating composition stability are lowered, and this may cause lowered processability and/or dent resistance.

The curing agent constituting the resin composition for can coating of the present invention is not particularly limited as long as it can react with the polyester resin of the present invention and form a cross linkage structure. Preferable examples thereof include an isocyanate compound, phenol resin, amino resin, and epoxy resin. In terms of the processability, the curing agent constituting the resin composition for can coating of the present invention is preferably an isocyanate compound, and more preferably a blocked isocyanate compound.

Examples of the isocyanate compounds include isocyanates, for example, aromatic diisocyanates such as 2,4-tolylenediisocyanate, 2,6-tolylenediisocyanate, xylene-1,4-diisocyanate, xylene-1,3-diisocyanate, tetramethylxylene diisocyanate, 4,4'-diphenylmethanediisocyanate, 2,4'-diphenylmethanediisocyanate, 4,4'-diphenyletherdiisocyanate, 2-nitrodiphenyl-4,4'-diisocyanate, 2,2'-diphenylpropane-4,4'-diisocyanate, 3,3'-dimethyldiphenylmethane-4,4'-diisocyanate, 4,4'-diphenylpropanediisocyanate, m-phenylenediisocyanate, p-phenylenediisocyanate, naphthylene-1,4-diisocyanate, naphthylene-1,5-diisocyanate, and 3,3'-dimethoxydiphenyl-4,4'-diisocyanate; aromatic polyisocyanates such as polymethylenepolyisocyanate and crude tolylene diisocyanate; aliphatic diisocyanates such as tetramethylene diisocyanate, hexamethylene diisocyanate (HDI), decamethylenediisocyanate, and lysinediisocyanate; alicyclic diisocyanates such as isophorone diisocyanate (IPDI), hydrogenated tolylene diisocyanate, hydrogenated xylenediisocyanate, and hydrogenated diphenylmethane diisocyanate; biuret-modified products of the aforementioned isocyanates; urethodione-modified products of the aforementioned isocyanates; carbodiimide-modified products of the aforementioned isocyanates; isocyanurate-modified products of the aforementioned isocyanates; urethodione-modified products of the aforementioned isocyanates; adducts of the aforementioned isocyanates with polyol; and mixtures of the modified products.

Among these, one, two, or more can be selected for use. Furthermore, they may be used in the form of urethane precursors such as prepolymers, modifications, derivatives, and mixtures of an isocyanate compound with a hydrogen group-containing compound such as a polyol or polyamine.

Preferable examples of the curing agents contained in the resin compositions for can coating of the present invention include a blocked isocyanate compound whose terminal NCO groups of isocyanate compound are blocked. Examples of the blocking agents include phenol-based compounds such as phenol, cresol, ethylphenol, and butyl phenol; alcohol-based compounds such as 2-hydroxypyridine, butyl cellosolve, propylene glycol mono-methyl ether, benzyl alcohol, methanol, ethanol, n-butanol, isobutanol, and 2-ethylhexanol; active methylene-based compounds such as dimethyl malonate, diethyl malonate, methyl acetoacetate, ethyl acetoacetate, and acetylacetone; mercaptan-based compounds such as butyl mercaptan and dodecyl mercaptan; acid amide-based compounds such as acetanilide and acetic acid amide; lactam-based compounds, such as ε-caprolactam, δ-valerolactam, and γ-butyrolactam; imidazole-based compounds such as imidazole and 2-methylimidazole; urea-based compounds such as urea, thiourea, and ethyleneurea; oxime-based compounds such as formamideoxime, acetaldehydeoxime, acetoneoxime, methyl ethyl ketone oxime, methyl isobutyl ketone oxime, and cyclohexanoneoxime; and amine-based compounds such as diphenylaniline, aniline, carbazole, ethyleneimine, and polyethyleneimine. These may be used singly, or in combination.

A reaction of such a blocking agent with an isocyanate curing agent component may be performed, for example, at 20 to 200° C., using a known inactive solvent and/or catalyst, if necessary. The blocking agent is preferably used in an amount 0.7 to 1.5 times by mole that of the terminal isocyanate groups.

The compounding ratio (weight ratio) of the blocked isocyanate compound used in the present invention is polyester resin/blocked isocyanate compound=98/2 to 50/50 (parts by weight), and more preferably polyester resin/curing agent=95/5 to 60/40 (parts by weight). When the compounding ratio of the blocked isocyanate compound is less than 2 parts by weight relative to 98 parts by weight of polyester resin, satisfactory curability cannot be achieved, and the processability, retort resistance, content, resistance, and/or dent resistance may be undesirably lowered. When the compounding ratio of the blocked isocyanate compound exceeds 50 parts by weight relative to 50 parts by weight of polyester resin, unreached curing agent components remain therein, which way undesirably lower the retort resistance and/or content resistance.

Depending on the properties required, the resin composition for can coating of the present invention can be combined with known inorganic pigments such as titanium oxide and silica; known additives such as phosphoric acid and esterified products thereof; curing catalysts such as organic tin compounds; and known additives such as surface smoothers, defoaming agents, dispersants, and lubricants. In particular, lubricants are important to apply lubricity to coating films required in forming DI cans, DR (or DRD) cans, or other cans. Preferable examples thereof include fatty acid ester wax, which is an esterified product of a polyol compound and a fatty acid, silicone-based wax, fluorine-based wax, polyolefin waxes such as polyethylene, lanolin-based wax, montan wax, microcrystalline wax, and carnauba wax. The lubricant may be used singly, or in a combination of two or more.

The resin composition for can coating of the present invention can be formed into a coating composition under the condition of being dissolved in a known organic solvent. Examples of the organic solvent usable in forming a coating composition include toluene, xylene, aromatic hydrocarbon, compounds, ethyl acetate, butyl acetate, methyl ethyl ketone, methyl isobutyl ketone, cyclohexanone, isophorone, methyl cellosolve, butyl cellosolve, ethylene glycol monoethyl ether acetate, diethylene glycol monoethyl ether acetate, ethylene glycol monoacetate, methanol, ethanol, butanol, ethylene glycol monoethyl ether, ethylene glycol monobutyl ether, diethylene glycol monobutyl ether, and the like. Among them, one, two, or mere compounds are selected from the viewpoint of solubility, vapor rate, etc., and then used.

Other resins may be added to the resin composition for can coating of the present invention in order to improve properties such as increasing flexibility of the coating film, applying adhesion, or the like. Examples of the other resins include a copolymer of copolymerized ethylene and polymerizable unsaturated carboxylic acid, and an ionomer of a copolymer of copolymerized ethylene and polymerizable carboxylic acid. By adding at least one resin selected from the above, the flexibility and/or adhesion of the coating film may be applied.

The resin composition for can coating of the present invention can be applied to one surface, both surfaces, or the edges thereof, if necessary, of any metal plate made of any metal that can be used for items such as beverage cans, canned food cans, lids therefor, caps, or the like. Examples of the metal materials include tin plate, tin-free steel, and aluminum. The metal plate made of the aforementioned materials may be subjected beforehand to phosphate treatment, chromic acid chromate treatment, phosphoric acid chromate treatment, corrosion prevention treatment using a rust prevention agent, and a surface treatment aiming to enhance the adhesion of the coating film.

The coated metal plate of the present invention can be obtained by applying the coating composition of the present invention to a metal plate by roll coater painting, spray painting, or other known coating methods. The coating thickness is not particularly limited; however, the thickness is preferably 3 to 18 μm based on a dry film thickness, and more preferably in the range of 3 to 10 μm. The baking conditions of the coating film is generally about 100 to 300° C. for about 5 seconds to 30 minutes, and more preferably about 150 to 250° C. for about 1 to 15 minutes.

EXAMPLES

The present invention is explained based on the Examples. However, the scope of the present invention is not limited to these Examples. The evaluation of the characteristic value in each Example was respectively measured based on the methods described below.

(1) Measurement of Resin Composition

A sample of polyester resin was dissolved in deuterated chloroform, and $^1$H-NMR analysis was performed using a 400-MR Nuclear Magnetic Resonance (NMR) system (manufactured by Varian Inc.). The molar ratio was calculated from the thus-obtained integrated value ratio.

(2) Measurement of Number Average Molecular Weight

A test sample of polyester resin was dissolved and/or diluted with tetrahydrofuran in such a manner that the resin concentration thereof became about 0.5 wt %, and the sample was filtered with a membrane filter made of polyethylene tetrafluoride having a pore size of 0.5 μm to obtain the test sample for measurement. The molecular weight was measured using gel permeation chromatography (GPC) having tetrahydrofuran as the mobile phase and a differential refractometer as the detector. The flow rate was 1 mL/min., and the column temperature was set at 30° C. KF-802, 804L, and 806L manufactured by Showa Denko K.K, were used as the columns. Monodisperse polystyrene was used for the molecular weight standard.

(3) Measurement of Reduced Viscosity (Unit: dl/g)

0.1 g of polyester resin sample was dissolved in a mixture solvent (25 cc) of phenol/tetrachloroethane (weight ratio 6/4), and measurement was performed at 30° C.

(4) Measurement of Glass Transition Temperature (Tg)

The glass transition temperature (Tg) was measured using a differential scanning calorimeter (manufactured by Seiko Instruments Inc.; DSC-200). A polyester resin sample (5 mg) was placed in a snap-in-lid-type aluminium container, and sealed. Using liquid nitrogen, the sample was cooled to −50° C., followed by heating to 150° C. at 20° C./min. In the endothermic curve obtained in this process, the temperature at the intersection of the baseline before an endothermic peak appeared, and the tangent extending toward an endothermic peak was determined to be a glass transition temperature (Tg, Unit: ° C.).

(5) Measurement of Acid Value 0.2 g of polyester resin sample was dissolved in 40 ml of chloroform, and the obtained solution was subjected to titration using a 0.01 N potassium hydroxide ethanol solution, obtaining an equivalent per $10^6$ g of carboxy group-containing resin (equivalent/$10^6$ g). Phenolphthalein was used as the indicator.

(6) Production of Test Piece

A coating composition was applied to one surface of a tin plate (JISG3303SPTE, 70 mm×150 mm×0.3 mm) with a bar coater in such a manner that the film thickness after drying became 5 to 8 μm, followed by curing by baking at 205° C. for 10 minutes, thereby giving a test piece (hereunder, this is referred to as a test piece).

(7) Evaluation of Processability

The thus-obtained test pieces were each bent 180° in the direction that the coating film faces outside. The processability was evaluated by measuring the electrical current value at the cracks of the coating film generated at the bent portion. A sponge (width: 20 mm, depth: 50 mm, thickness: 10 mm) soaked in a 1% NaCl aqueous solution was placed on an aluminum plate electrode (width: 20 mm, depth: 50 mm, thickness: 0.5 mm). The central part of the bent portion of the test piece was made to contact the sponge in such a manner that it was parallel to the 20 mm-side of the sponge. Direct-current voltage of 5.0 V was applied across the aluminum plate electrode and the back surface of the test piece, and then the flowing current value was measured. The smaller the flowing current value, the better the bending property.

Criteria

A: Less than 0.5 mA
B: 0.5 mA or more but less than 1.0 mA
C: 1.0 mA or more but less than 2.0 mA
D: 2.0 mA or more

(8) Evaluation of Curability

Gauze felt soaked in methyl ethyl ketone was pressed against the coating film surface of the test piece in such a manner that the contact area became 1 cm², and then a rubbing test was carried out with a load of 500 g. The number of rubs until the coating film peeled off (one back-and-forth rub was counted as one) was counted. The results were evaluated based on the following criteria.

Criteria

A: The coating film would not peel off even after rubbing 50 times or more, and no change in the coating film was observed.
B: The coating film peeled off after rubbing 25 to 49 times, and the tin plate became exposed.
C: The coating film peeled off after rubbing 16 to 24 times, and the tin plate became exposed.
D: The coating film peeled off after rubbing 15 times or fewer, and the tin plate became exposed.

(9) Evaluation of Retort Resistance

The test pieces were each individually stood in a stainless steel cup. Ion exchange water was poured into the cup until the top of the water reached half the height of the cup. The result was placed in an autoclave of a retort testing machine (Tommy Industry Co., Ltd.; ES-315), and then subjected to a retort treatment at 125° C. for 90 minutes. Evaluation after the treatment was performed at the portion in which vapor was in contact, which is the portion of a coating film that is generally supposed to be exposed to more severe conditions. Blushing of the coating film and blister conditions were visually observed and evaluated based on the following criteria.

Criteria

A: Excellent
B: Slight blushing but no blisters were observed
C: Some blushing and/or some blister were observed
D: Remarkable blushing and/or remarkable blister were observed

(10) Evaluation of Content Resistance

The test pieces were each individually stood in a stainless steel cup. An aqueous solution containing 3 wt % table salt and 3 wt % citric acid was poured into the cup until the entire test piece was immersed in the solution. The result was placed in an autoclave of a retort testing machine (Tommy Industry Co., Ltd.; ES-315), and then subjected to a treatment at 125° C. for 90 minutes. Thereafter, blushing of the coating film and blister conditions were visually observed and evaluated based on the following criteria.

Criteria

A: Excellent
B: Slight blushing but no blisters were observed
C: Some blushing and/or some blister were observed
D: Remarkable blushing and/or remarkable blister were observed

(11) Evaluation of Dent Resistance

Using a DuPont impact tester, the following test was performed. The test piece that was subjected to the retort treatment described in (9) was placed with the coating surface facing down. In the test piece, a drop punch with a head portion having a diameter of ½ inch was pressed against the non-painted portion within the area that was in contact with steam. A weight of 1 kg was dropped onto the test piece from a height of 50 cm to apply impact. Subsequently, a sponge (width: 20 mm, depth: 50 mm, thickness: 10 mm) soaked in a 1 wt % NaCl aqueous solution was placed on an aluminum plate electrode (width: 20 mm, depth: 50 mm, thickness: 0.5 mm). The convex portion of the test piece, to which impact was applied, was made to contact the sponge. Direct-current voltage of 5.0 V was applied across the aluminum plate electrode and the unpainted portion on the back surface of the test piece to measure the electrical current value. The smaller the electrical current value, the better the bending property.

Criteria

A: Less than 0.5 mA
B: 0.5 mA or more but less than 1.0 mA
C: 1.0 mA or more but less than 2.0 mA
D: 2.0 mA or more Synthetic Example (1) of Polyester Resin by Direct Polymerization Method Terephthalic acid (2251 parts by weight), 2,6-naphthalenedicarboxylic acid (189 parts by weight), trimellitic anhydride (28 parts by weight), ethylene glycol (344 parts by weight), 1,2-propylene glycol (1795 parts by weight), and, as a catalyst, 1.0 part by weight of tetra-n-butyltitanate (hereunder may be referred to as TBT) (0.02 mol % relative to the total acid components) were placed in a 10 L-autoclave. An esterification reaction was performed while applying nitrogen pressurization at 3.5 Kg/cm·G and gradually heating to 235° C. over 3 hours. Subsequently, the pressure of the inside system was gradually reduced to perform polymerization by depressurization to 10 mmHg over one hour. At the same time, the temperature was increased to 250° C. The post-polymerization was further performed under vacuum of 1 mmHg or less for 70 minutes, giving the polyester resin of the present invention (Synthetic Example (1)). The thus-obtained polyester resin had a number average molecular weight of 21,000, a reduced viscosity of 0.63 dl/g, a glass transition temperature (Tg) of 85° C., an acid value of 15 eq/t, and a specific gravity (30° C.) of 1.280.

Synthetic Examples (2) to (8) and Comparative Synthetic Examples (1) to (6) by a Direct Polymerization Method The polyester resins of the present invention (Synthetic Examples (2) to (8) and Comparative Synthetic Examples (1) to (6)) were produced by the same direct polymerization method as in Synthetic Example (1), except that the composition of the starting materials was changed so that the resulting resins would have the compositions shown in Tables 1 and 2.

Synthetic Example (9) of Polyester Resin by Transesterification

Dimethyl terephthalate (878 parts by weight), dimethyl 2,6-naphthalenedicarboxylate (71 parts by weight), trimellitic anhydride (9 parts by weight), ethylene glycol (115 parts by weight), 1,2-propylene glycol (599 parts by weight), and, as a catalyst, 0.3 part by weight of tetra-n-butyltitanate (hereunder may be referred to as TBT) (0.02 mol % relative to the total acid components) were placed in a 3 L-flash equipped with a stirrer, capacitor, and thermometer. The transesterification reaction was performed while heating from 160° C. to 220° C. over 4 hours. Subsequently, the pressure of the inside system was gradually reduced to perform initial polymerization by depressurization to 5 mmHg over 20 minutes. At the same time, the temperature was increased to 250° C. Post-polymerization was further performed under vacuum of 1 mmHg or less for 70 minutes, giving the polyester resin of the present invention (Synthetic Example (9)).

TABLE 1

| | | | Synthetic Example 1 | Synthetic Example 2 | Synthetic Example 3 | Synthetic Example 4 | Synthetic Example 5 |
|---|---|---|---|---|---|---|---|
| Resin Composition | Polycarboxylic acid Components | Terephthalic acid | 93 | 88 | 79 | 60 | 98 |
| | | 2,6-Naphthalenedicarboxylic Acid | 6 | 12 | 18 | 20 | 2 |
| | | Isophthalic acid | | | 3 | 9.2 | |
| | | Trimellitic acid | 1 | | | 0.8 | |
| | | Sebacic acid | | | | 10 | |
| | | Trimellitic acid (post-synthesis addition) | | | | | |
| | Polyalcohol (Polyol) Components | Ethylene glycol | 25 | 30 | 10 | 20 | 18 |
| | | 1,2-propyleneglycol | 75 | 69.5 | 79.3 | 70 | 66.4 |
| | | Neopentylglycol | | | | | 5 |
| | | 1,4-Cyclohexanedimethanol | | | 10 | | 10 |
| | | 2-Methyl-1,3-propanediol | | | | 10 | |
| | | Trimethylolpropane | | 0.5 | 0.7 | | 0.6 |
| Resin Characteristic | | Number average molecular weight | 21,000 | 12,500 | 13,000 | 14,500 | 11,000 |
| | | Reduced viscocity (dl/g) | 0.63 | 0.48 | 0.50 | 0.53 | 0.45 |
| | | Tg (° C.) | 85 | 86 | 87 | 72 | 82 |
| | | Acid value (eq/t) | 15 | 14 | 5 | 4 | 6 |
| | | Specific gravity (30° C.) | 1.280 | 1.278 | 1.268 | 1.260 | 1.261 |

| | | | Synthetic Example 6 | Synthetic Example 7 | Synthetic Example 8 | Synthetic Example 9 |
|---|---|---|---|---|---|---|
| Resin Composition | Polycarboxylic acid Components | Terephthalic acid | | 90 | 65 | 93 |
| | | 2,6-Naphthalenedicarboxylic Acid | 80 | 9.5 | 35 | 6 |

TABLE 1-continued

|  |  |  |  |  |  |
|---|---|---|---|---|---|
|  | Isophthalic acid | 10 |  |  |  |
|  | Trimellitic acid |  | 0.5 |  | 1 |
|  | Sebacic acid | 10 |  |  |  |
|  | Trimellitic acid (post-synthesis addition) | 1 |  |  |  |
| Polyalcohol (Polyol) Components | Ethylene glycol |  | 35 | 12 | 25 |
|  | 1,2-propyleneglycol | 99 | 45 | 64.4 | 75 |
|  | Neopentylglycol |  |  |  |  |
|  | 1,4-Cyclohexanedimethanol |  | 20 | 23 |  |
|  | 2-Methyl-1,3-propanediol |  |  |  |  |
|  | Trimethylolpropane | 1 |  | 0.6 |  |
| Resin Characteristic | Number average molecular weight | 8,000 | 13,500 | 19,000 | 21,000 |
|  | Reduced viscocity (dl/g) | 0.4 | 0.51 | 0.61 | 0.63 |
|  | Tg (° C.) | 80 | 90 | 97 | 85 |
|  | Acid value (eq/t) | 85 | 3 | 5 | 15 |
|  | Specific gravity (30° C.) | 1.262 | 1.260 | 1.254 | 1.280 |

TABLE 2

|  |  |  | Comparative Synthetic Example 1 | Comparative Synthetic Example 2 | Comparative Synthetic Example 3 | Comparative Synthetic Example 4 | Comparative Synthetic Example 5 | Comparative Synthetic Example 6 |
|---|---|---|---|---|---|---|---|---|
| Resin Composition | Polycarboxylic acid Components | Terephthalic acid | 99.5 | 99.8 |  | 45 | 82 | 55 |
|  |  | 2,6-Naphthalenedicarboxylic Acid |  |  | 100 | 15 | 18 | 45 |
|  |  | Isophthalic acid |  |  |  | 40 |  |  |
|  |  | Trimellitic acid | 0.5 | 0.2 |  |  |  |  |
|  |  | Sebacic acid |  |  |  |  |  |  |
|  |  | Trimellitic acid (post-synthesis addition) |  |  |  |  |  |  |
|  | Polyalcohol (Polyol) Components | Ethylene glycol | 10 | 25 | 35 | 20 | 15 | 40 |
|  |  | 1,2-propyleneglycol | 75 | 75 | 44.3 | 69.5 | 25 | 34.5 |
|  |  | Neopentylglycol |  |  |  |  |  |  |
|  |  | 1,4-Cyclohexanedimethanol | 15 |  | 20 |  |  | 25 |
|  |  | 2-Methyl-1,3-propanediol |  |  |  |  | 60 |  |
|  |  | Trimethylolpropane |  |  | 0.7 | 0.5 |  | 0.5 |
| Resin Characteristic |  | Number average molecular weight | 16,000 | 18,000 | 5,000 | 13,000 | 16,000 | 12,000 |
|  |  | Reduced viscocity (dl/g) | 0.55 | 0.58 | 0.32 | 0.50 | 0.55 | 0.47 |
|  |  | Tg (° C.) | 83 | 77 | 115 | 82 | 62 | 108 |
|  |  | Acid value (eq/t) | 5 | 17 | 7 | 18 | 10 | 3 |
|  |  | Specific gravity (30° C.) | 1.248 | 1.275 | 1.256 | 1.272 | 1.246 | 1.280 |

Production Example of Resin Varnish

Polyester resins produced in Synthetic Examples (1) to (9) and Comparative Synthetic Examples (1) to (6) were dissolved in cyclohexanone/Solvesso 150=1/1 (weight ratio), preparing resin varnish with a solids content of 40 wt %.

Example (1)

Resin varnish of Synthetic Example (1) (45 parts), IPDI-based blocked isocyanate (manufactured by Bayer MaterialScience, Desmodur VP LS 2078/2, solids content of 60 wt %, 3.3 parts), and DBTL (dibutyltin dilaurate, 0.02 parts) were mixed. The resulting mixture was diluted with cyclohexanone/Solvesso 150=1/1 (weight ratio) until its viscosity became desirable for coating, obtaining the coating composition of the present invention. The thus-obtained composition was applied by the method described above and baked, thereby obtaining a test piece of the coated metal plate of the present invention. Tables 3 and 4 show the proportions of the components of each coating composition, and the evaluation results of the test pieces.

Examples (2) to (8) and Comparative Examples (1) to (7)

The resin composition for can coating of the present invention was obtained in the same manner as in Example (1), except that the compositions were changed to those shown in Table 3 or 4. Subsequently, the application and baking were performed in the same manner as described above, thereby obtaining a test piece of the coated metal plate of the present invention. Table 3 shows the proportions of the components of each coating composition and the evaluation results of the test pieces.

TABLE 3

|  |  | Example 1 | Example 2 | Example 3 | Example 4 | Example 5 | Example 6 | Example 7 | Example 8 | Example 9 |
|---|---|---|---|---|---|---|---|---|---|---|
| Coating composition Components/ Solids weight ratio | Type of polyester resin | Synthetic Example 1 | Synthetic Example 2 | Synthetic Example 3 | Synthetic Example 4 | Synthetic Example 5 | Synthetic Example 6 | Synthetic Example 7 | Synthetic Example 8 | Synthetic Example 9 |
|  | Amount of polyester resin | 90 | 83 | 75 | 85 | 70 | 65 | 85 | 80 | 90 |
|  | Blocked isocyanate compound — Coronate 2513 |  |  | 25 |  | 30 |  |  |  |  |
|  | VESTANAT B 1370 |  |  |  | 15 |  | 35 |  | 20 |  |
|  | DESMODUR VP LS 2078/2 | 10 | 17 |  |  |  |  | 15 |  | 10 |
|  | Catalyst DBTL | 0.1 | 0.1 | 0.1 | 0.1 | 0.1 | 0.1 | 0.1 | 0.1 | 0.1 |
| Film Performance | Processability | A | A | A | B | B | B | B | B | A |
|  | Curability | A | A | A | A | B | A | A | B | A |
|  | Retort resistance | A | A | A | B | A | A | A | B | A |
|  | Content resistance | A | A | A | B | A | A | A | B | A |
|  | Dent resistance | A | A | A | B | B | B | B | B | A |

TABLE 4

|  |  | Com. Ex. 1 | Com. Ex. 2 | Com. Ex. 3 | Com. Ex. 4 | Com. Ex. 5 | Com. Ex. 6 | Com. Ex. 7 |
|---|---|---|---|---|---|---|---|---|
| Coating composition Components/ Solids weight ratio | Type of polyester resin | Comparative Synthetic Example 1 | Comparative Synthetic Example 2 | Comparative Synthetic Example 3 | Comparative Synthetic Example 4 | Comparative Synthetic Example 5 | Comparative Synthetic Example 6 | Synthetic Example 1 |
|  | Amount of polyester resin | 80 | 90 | 60 | 75 | 88 | 80 | 100 |
|  | Blocked isocyanate compound — Coronate 2513 |  |  | 40 |  |  |  |  |
|  | VESTANAT B 1370 | 20 |  |  |  | 12 |  |  |
|  | DESMODUR VP LS 2078/2 |  | 10 |  | 25 |  | 20 |  |
|  | Catalyst DBTL | 0.1 | 0.1 | 0.1 | 0.1 | 0.1 | 0.1 | 0.1 |
| Film Performance | Processability | D | C | D | D | B | D | D |
|  | Curability | D | D | B | A | B | A | D |
|  | Retort resistance | A | B | A | A | D | A | C |
|  | Content resistance | A | B | A | A | D | A | D |
|  | Dent resistance | C | C | C | D | C | C | D |

Coronate 2513: manufactured by Nippon Polyurethane Industry Co. Ltd., HDI-based blocked isocyanate compound Vestanat B 1370: manufactured by Evonik Industries AG, IPDI-based blocked isocyanate compound Desmodur VP LS 2078/2: manufactured by Bayer MaterialScience, IPDI-based blocked isocyanate compound DBTL: dibutyltin dilaurate As is clear from Tables 3 and 4, the coating film obtained from the resin composition for can coating that uses the polyester resin of the present invention exhibits excellent properties in ail of processability, curability, retort resistance, content resistance, and dent resistance.

INDUSTRIAL APPLICABILITY

The product of the present invention is a polyester resin, a resin composition for can coating, and a coated metal plate for can to which the can coating was applied, the can coating having excellent processability, curability, retort resistance, content resistance, and dent resistance. The product of the present invention is suitably used as a main component of a coating composition applied to food and beverage cans, etc.

The invention claimed is:
1. A resin composition for can coating comprising a polyester resin, a blocked isocyanate compound and a curing catalyst,
  wherein the composition comprises at least 65% by weight of the polyester resin relative to the total weight of the composition,
  wherein a weight ratio of the polyester resin to the blocked isocyanate compound (polyester resin/blocked isocyanate compound) is 90/10 to 75/25,
  wherein the polyester resin is obtained from a polycarboxylic acid component and a polyol component,
  wherein the polyester resin meets the conditions (i) to (vii) described below:
    (i) among the polycarboxylic acid components constituting the polyester resin, the total copolymerization ratio of terephthalic acid component and 2,6-naphthalenedicarboxylic acid component is 95 to 100 mol %;
    (ii) among the polycarboxylic acid components constituting the polyester resin, the copolymerization ratio of 2,6-naphthalenedicarboxylic acid component is 4 to 18 mol %;
    (iii) among the polyol components constituting the polyester resin, the total copolymerization ratio of ethylene glycol component and 1,2-propylene-glycol component is 80 to 100 mol %;
    (iv) among the polyol components constituting the polyester resin, the copolymerization ratio of 1,2-propylene-glycol component is excessive relative to the copolymerization ratio of the ethylene glycol component;
    (v) among the polyol components constituting the polyester resin, the copolymerization ratio of ethylene glycol component is 10 to 30 mol %;
    (vi) among the polyol components and the polycarboxylic acid components constituting the polyester resin, the total copolymerization ratio of a tri- or higher functional polyol and a tri- or higher functional polycarboxylic acid is 0.5 to 1 mol %; and
    (vii) wherein the polyester resin has a glass transition temperature (Tg) of 72° C. or more, and an acid value of 85 eq/t or less.

2. A method for producing a coated metal plate for can comprising a step of applying the resin composition for can coating of claim 1 to a metal plate and curing the resin composition.

3. A coated metal plate for forming a can wherein on a surface of said metal plate a layer comprising a cured product of the resin composition according to claim 1 is placed.

4. A can comprising the coated metal plate of claim 3.

5. The resin composition for can coating according to claim 1, wherein the polyester resin has a reduced viscosity of 0.3 to 0.7 dl/g, and a specific gravity (30° C.) of 1.245 or more.

6. A coated metal plate for can on which a layer comprising a cured product of the resin composition for can coating according to claim 5 is placed on the surface of the metal plate.

* * * * *